(12) United States Patent
Hayashi et al.

(10) Patent No.: US 6,808,435 B2
(45) Date of Patent: Oct. 26, 2004

(54) PAINT FOR FORMING INSULATING FILM, AND PLASMA DISPLAY PANEL USING THE PAINT AND METHOD OF MANUFACTURING THE SAME

(75) Inventors: Tomohiro Hayashi, Osaka (JP); Tatsuo Mifune, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 233 days.

(21) Appl. No.: 09/975,683

(22) Filed: Oct. 10, 2001

(65) Prior Publication Data
US 2002/0063527 A1 May 30, 2002

(30) Foreign Application Priority Data

Oct. 11, 2000 (JP) ........................................ 2000-310390
Jan. 30, 2001 (JP) ........................................ 2001-021399

(51) Int. Cl.$^7$ .............................. H01J 9/24; B32B 27/06
(52) U.S. Cl. ........................ 445/24; 428/480; 427/121
(58) Field of Search .......................... 428/328, 1.4, 323, 428/357, 372, 432, 702, 480; 445/24, 25; 313/582–587, 479, 110; 427/121, 229, 379

(56) References Cited

U.S. PATENT DOCUMENTS 4,814,132 A * 3/1989 Aoki et al. .................. 264/165
5,879,217 A * 3/1999 Saito et al. .................... 445/23
6,617,018 B2 * 9/2003 Tamai et al. ................. 428/328

FOREIGN PATENT DOCUMENTS

| JP | 8-309251 | 11/1996 |
| JP | 9-283060 | 10/1997 |
| JP | 10-307390 | 11/1998 |
| JP | 11-323147 | 11/1999 |
| JP | 2000-16835 | 1/2000 |

* cited by examiner

Primary Examiner—Joseph Williams
(74) Attorney, Agent, or Firm—Merchant & Gould P.C.

(57) ABSTRACT

The present invention provides a paint for forming an insulating film, which has a good wettability to a surface to be coated with the paint and has no voids or pin-holes after being fired; a plasma display panel including a dielectric layer formed using the paint; and a method of manufacturing the plasma display panel. The paint contains inorganic fine particles, a binder resin, and an organic solvent that has a good wettability to glass such as a glass substrate, ceramic as an Ag electrode, and a metal compound such as an ITO film and forms a contact angle of less than 5° with these inorganic materials. Accordingly, the paint has a good wettability to a glass substrate, an Ag electrode, and an ITO film and the resultant insulating film thus has no voids or pin-holes.

5 Claims, 2 Drawing Sheets

FIG. 1

PRIOR ART

FIG. 2

PAINT FOR FORMING INSULATING FILM, AND PLASMA DISPLAY PANEL USING THE PAINT AND METHOD OF MANUFACTURING THE SAME

BACKGROUND OF THE INVENTION

1. Field of the Invention

The present invention relates to a paint for forming an insulating film used in a plasma display panel, a plasma address liquid crystal display, or an image forming apparatus using electron-emitting elements, and to a plasma display panel in which an address electrode protective film and partition walls provided on its back plate and a dielectric layer provided on its front plate are formed using this paint. It is to be noted that the term "paint" used in this application means a liquid composition using a volatile carrier and coating a components in which the coating components are left behind on a surface after the evaporation of the carrier.

2. Description of the Related Art

As an image forming apparatus that can be substituted for a heavy and large conventional cathode-ray tube, there has been increasing demand for a thin and light flat-type display or, as it is called, a flat panel display (FPD). A typical FPD is a liquid crystal display (LCD). However, LCDs have problems such that images obtained are dark, a viewing angle is narrow, and it is difficult to increase an area thereof. Therefore, in recent years, a plasma display panel (PDP) and an image forming apparatus using electron-emitting elements are attracting great attention and the demand for them has been growing because they can be increased in definition and in size further than LCD.

Figure 1:
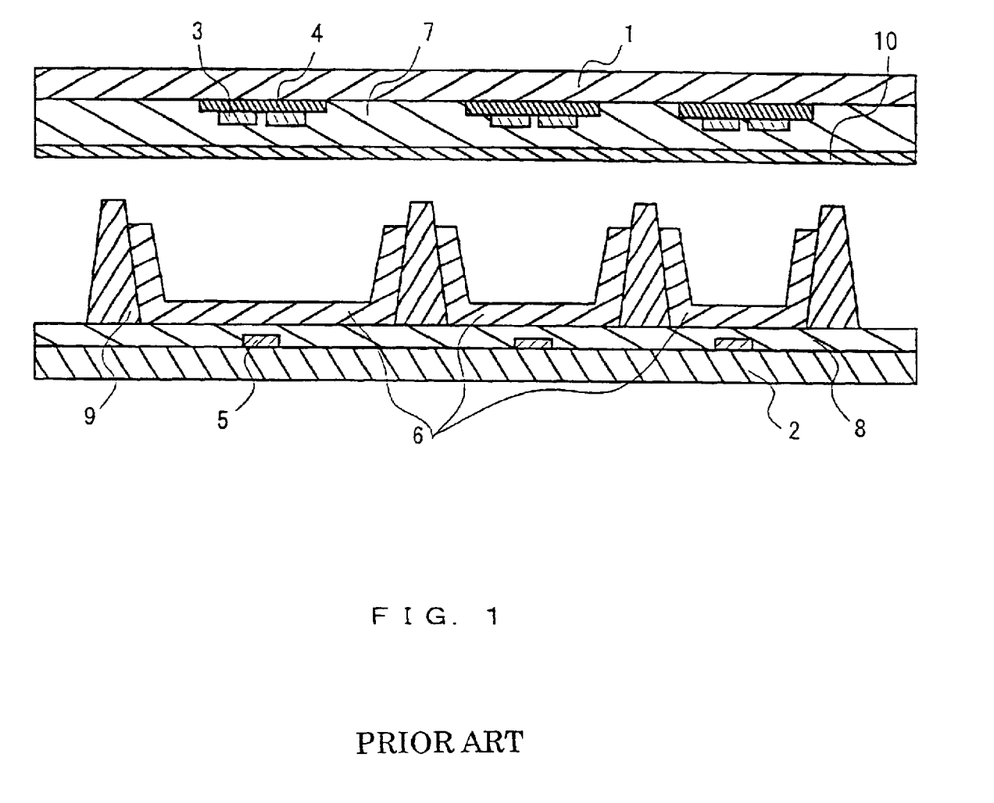
FIG. 1 is a cross-sectional view illustrating a structure of a plasma display panel.

FIG. 1 shows one example of a structural view (cross-sectional view) of PDP. Hereinafter, the principle of display by PDP will be explained with reference to FIG. 1.

Between each pair of display electrodes 3 provided on a front glass substrate 1, plasmas are discharged to generate ultraviolet rays. The ultraviolet rays excite phosphors 6, which are separated from each other by partition walls 9 provided on a back glass substrate 2, to make the phosphors emit visible lights. The visible lights emitted from the respective phosphors 6 pass through an MgO film 10, a front dielectric layer 7, and the front glass substrate 1 to be displayed as an image. At this time, by applying signals to selected address electrodes 5 to specify the discharge cells to be displayed, a desired image can be obtained.

To generate and maintain plasmas, the electrodes need to be insulated from each other. The front dielectric layer 7 is provided to obtain an insulating effect. The front dielectric layer 7 is obtained as follows: a paint obtained by dispersing a resin and inorganic fine particles, which are glass powder mainly containing Si or the like, in an organic solvent is coated onto the front glass substrate, and the paint is dried and fired, thereby giving the dielectric layer 7. The organic solvent is vaporized during the drying process. During the firing process, the resin is vaporized and the glass powder melt to be joined to each other. The paint turns into a glass film when cooled after the firing, thus forming the front dielectric layer 7.

On the back glass substrate 2, the back dielectric layer 8 is provided for the purpose of protecting the address electrodes 5. The back dielectric layer 8 is formed in the same manner as that for the front dielectric layer 7.

Typically, an insulating film formed using glass is used as the front dielectric layer 7 and the back dielectric layer 8. For example, JP 2000-16835 A proposes using an insulation paste containing 70 to 95 wt. % of glass powder having an average particle diameter of 0.3 to 1.5 $\mu$m and a maximum particle diameter of not more than 10 $\mu$m and 5 to 30 wt. % of an organic component as a paste for forming thin insulating films as protective films provided on a front glass substrate and a back glass substrate and thick insulating films covering the electrodes on both the glass substrates.

As the phosphors 6, phosphors that emit lights of R (red), G (green), and B (blue), respectively, are used, and the partition walls 9 are provided to prevent these three colors from being mixed with each other. Like the front dielectric layer 7 and the back dielectric layer 8, the partition walls 9 are obtained also by coating a paint obtained by dispersing a resin and inorganic fine particles, which are glass powder mainly containing Si or the like, in an organic solvent, drying the paint, and then exposing/developing the paint in a desired pattern (photolithography) or etching the paint in a desired pattern by having fine particles of Zr or the like collide with the paint (sandblasting).

Known electron-emitting elements can be broadly classified into two types: hot cathode electron-emitting elements and cold cathode electron-emitting elements. In recent years, an image forming apparatus using cold cathode electron-emitting elements has been attracting attention because it does not consume powder during the standby period and can attain a high current density. The cold cathode electron-emitting elements can be classified into those of field emission type (FE type), metal/insulator/metal type (MIM type), and the like. In an image forming apparatus using cold cathode electron-emitting elements, phosphors emit lights upon being irradiated with electron beams emitted from the electron-emitting elements, thereby displaying an image.

Like the plasma display panel, the image forming apparatus using cold cathode electron-emitting elements also employs a glass insulating film. For example, a back glass substrate of the image forming apparatus includes a plurality of electron-emitting elements and wirings arranged in matrix for connecting these elements. These wirings are arranged in the X direction and Y direction to intersect with each other at the portions of the electrodes of the electron-emitting elements. To insulate the wirings and the electrodes at these intersections, a belt-shaped insulating film is needed. Such an interlayer insulating film is formed using, for example, glass containing lead oxides as a main component so that the thickness of the film becomes 10 to 100 $\mu$m, preferably 20 to 50 $\mu$m.

For example, JP 9(1997)-283060 A discloses that lower wirings are formed under an insulating film, a belt-shaped insulating film is then provided so as to intersect with the lower wirings at a right angle, and upper wirings are provided on the belt-shaped insulating film.

Therefore, like the plasma display panel, the image forming apparatus using cold cathode electron-emitting elements needs an insulating film, and the insulating film needs to have electrical insulating properties and exhibit a shielding effect as a protective film. Typically, such an insulating film is formed by a method such as vacuum evaporation, spattering, coating, or the like.

However, the methods utilizing a vacuum such as vacuum evaporation and spattering require costly production facilities. Especially in the case of manufacturing FPD, which seeks an increased area as described above, the manufacturing costs become even higher. Therefore, in FPD, reasonable coating methods such as screen printing and die coating commonly are used as a method of forming an insulating film.

However, when an insulating film is formed by the coating method, voids and/or pin-holes are generated in the resultant insulating film unless characteristics of the paint used for forming the film has been optimized. Thus, according to the coating method, it is difficult to obtain an insulating film producing a desired insulating effect. The voids and/or pin-holes are considered to be generated as a result of incorporation of foreign materials and/or air bubbles. Other than this, the insufficient wettability of the solvent contained in the paint is considered to be the major cause of the generation of the voids and/or pin-holes.

If the solvent has a poor wettability to the surface to be coated with the paint, crawling occurs, which accompanies the generation of cavities. Crawling is the phenomenon in which the paint is not spread evenly on the surface so that uncoated portions result. Therefore, the resultant insulating film is form ed unevenly and a desired insulating effect thus cannot be obtained. Further, when the surface to be coated with the paint has roughness, the chances of crawling occurring and the generation of cavities increase. Moreover, when the surface to be coated with the paint is formed of two or more materials, e.g., the case where Ag is formed on a glass substrate in a stripe-shape, the occurrence of crawling and the generation of the cavities become more remarkable. As a result, the resultant insulating film is formed still more unevenly so that some portions of the film have a thickness smaller than the other portions of the film. A desired insulating effect thus cannot be obtained.

Conventional paints for forming an insulating film generally contain α-terpineol or butyl carbitol acetate as a solvent. However, these solvents do not have a good wettability to glass and thus causes crawling of the paint, which accompanies the generation of voids and/or pin-holes in the resultant film, separation of the film, etc.

Therefore, in conventional paints for forming an insulating film, firing characteristics of the paints have been controlled by adjusting the composition of the inorganic component, especially glass powder, to obtain a desired insulating effect. However, no attempt has been made to control the wettability of the paints by adjusting the composition of the solvent as a dispersion medium necessary to form the paints.

SUMMARY OF THE INVENTION

Therefore, with the foregoing in mind, it is an object of the present invention to provide a paint for forming an insulating film, which has a good wettability to a surface to be coated with the paint and has no voids or pin-holes after being fired. It is also an object of the present invention to provide a plasma display panel in which dielectric layers provided on its back plate and front plate and partition walls provided on its back plate are formed using the paint and a method of manufacturing the same.

In order to solve the above-mentioned conventional problems, the inventors of the present invention have conducted a study on how to bring the action of a paint for forming an insulating film on a glass substrate, an ITO (indium tin oxide) film, Ag electrodes, etc., to the best condition to improve the ease of coating and the characteristics of the paint film. As a result, the inventors have found that, when the paint contains a solvent having a good wettability to inorganic materials such as a glass substrate, an ITO film, and Ag electrodes, crawling between the paint and the surface coated with the paint and generation of voids and/or pin-holes in the paint film hardly occur and separation of the paint film due to the insufficient adhesion between the paint and the surface thus can be prevented. From this fact, the inventors have found that plasma display panels having excellent voltage endurance characteristics can be obtained with high yield by forming a dielectric layer of a front panel and the like using this paint, thereby establishing the present invention.

Therefore, a paint for forming an insulating film on an inorganic material, which is at least one selected from glass, ceramic, and a metal compound, includes inorganic fine particles (a), a binder resin (b), and a solvent (c) that forms a contact angle of less than 50 with the inorganic material.

In the above-mentioned paint for forming an insulating film, it is preferable that the inorganic material contains glass, ceramic, and a metal compound. The paint for forming an insulating film according to the present invention exhibits a particularly excellent effect on such an inorganic material. More specifically, the glass is a glass substrate, the ceramic is an ITO film, and the metal compound is a metal electrode.

In the paint for forming an insulating film according to the invention, it is preferable that the solvent (c) contains 50 wt. % or more of at least one solvent selected from diethyl carbitol, dipropylene glycol-n-propyl ether, tripropylene glycol monomethyl ether, diethyl cellosolve, carbitol acetate, dibutyl cellosolve, and propylene glycol diacetate. By using the above solvents, the wettability of the paint to the inorganic material is improved.

Further, in the paint for forming an insulating film according to the invention, it is preferable that the solvent (C) contains 50 wt. % or more of at least one solvent selected from diethyl carbitol, dipropylene glycol-n-propyl ether, tripropylene glycol monomethyl ether, and diethyl cellosolve. By using the above solvents, the wettability of the paint to the glass substrate and the electrodes is made uniform even when the substrate has dirt thereon.

Furthermore, it is more preferable that the solvent (c) contains at least two solvents selected from diethyl carbitol, dipropylene glycol-n-propyl ether, tripropylene glycol monomethyl ether, and diethyl cellosolve. By using the above solvents, the generation of voids and/or cavities in the paint film is further suppressed and the voltage endurance characteristics are further improved.

In the paint for forming an insulating film according to the invention, the inorganic fine particles (a) preferably are at least one selected from $SiO_2$, $ZnO$, $B_2O_3$, $PbO$, $Bi_2O_3$, $BaO$, $P_2O_5$, $CaO$, $SrO$, and $MgO$.

In the paint for forming an insulating film according to the invention, the binder resin (b) preferably is at least one selected from a cellulosic resin, an acrylic resin, polyvinyl alcohol, and polyvinyl butyral.

Further, it is preferable that the paint for forming an insulating film according to the invention contains 10 to 95 wt. % of the inorganic fine particles (a), 1 to 20 wt. % of the binder resin (b), and 4 to 85 wt. % of the solvent (c).

The paint for forming an insulating film according to the invention preferably is used for forming an insulating film used in a plasma display panel, a plasma address liquid crystal display, or an image forming apparatus using electron-emitting elements. The insulating film serves as an address electrode protective film or partition walls formed on a back plate, or a dielectric layer formed on a front plate of a plasma display panel.

Next, a method of manufacturing a plasma display panel according to the present invention includes the acts of coating a paint for forming an insulating film onto a member of a plasma display panel, the paint including inorganic fine particles (a), a binder resin (b), and a solvent (c) that forms a contact angle of less than 5° with an inorganic material; and firing the paint to form an insulating film on the member.

In the above-mentioned method of manufacturing a plasma display panel, it is preferable that the member is a back plate, which is provided with address electrodes, of a plasma display panel and the insulating film serves as an address electrode protective film.

Further, in the above-mentioned method of manufacturing a plasma display panel, it is preferable that the member is a back plate of a plasma display panel and the insulating film serves as partition walls. Typically, the partition walls are formed on the address electrodes formed on the back plate of the plasma display panel.

Furthermore, in the above-mentioned method of manufacturing a plasma display panel, it is preferable that the member is a front plate, which is provided with display electrodes, of a plasma display panel and the insulating film serves as a dielectric layer.

Still further, it is preferable that the member such as a back plate and a front plate of a plasma display panel is cleaned by ultraviolet cleaning before being coated with the paint. Since organic dirt on the glass substrate and the electrodes can be removed by the ultraviolet cleaning, the wettability of the paint to the glass substrate and the electrodes can be improved, thereby suppressing the occurrence of crawling.

Next, a plasma display panel according to the present invention includes an insulating film that is obtained by coating a paint for forming an insulating film onto an inorganic material, the paint including inorganic fine particles (a), a binder resin (b), and a solvent (c) that forms a contact angle of less than 5° with the inorganic material.

In the above-mentioned plasma display panel, it is preferable that the insulating film serves as an address electrode protective film.

In the above-mentioned plasma display panel, it is preferable that the insulating film serves as partition walls.

In the above-mentioned plasma display panel, it is preferable that the insulating film serves as a dielectric layer.

These and other advantages of the present invention will become apparent to those skilled in the art upon reading and understanding the following detailed description with reference to the accompanying figures.

DETAILED DESCRIPTION OF THE INVENTION

Hereinafter, embodiments of the present invention will be described.

A paint for forming an insulating film according to the present invention suitably is used for forming an insulating film used in a plasma display panel, a plasma address liquid crystal display, or an image forming apparatus using electron-emitting elements.

The paint for forming an insulating film on an inorganic material according to the present invention includes inorganic fine particles (a), a binder resin (b) for binding the inorganic fine particles, and a solvent (c) for dissolving the binder resin, the solvent forming a contact angle of less than 5° with the inorganic material. In other words, the paint according to the present invention is composed of an inorganic component and an organic component, the inorganic component being inorganic fine particles (a) and the organic component containing at least a resin (b) serving as a binder for binding the inorganic component and a solvent (c) for dissolving the resin, which forms a contact angle of less than 5° with an inorganic material. The solvent is used for dispersing the inorganic component and for dissolving the binder resin.

The paint for forming an insulating film according to the present invention is coated onto a desired portion of an inorganic material, which is the surface to be coated with the paint so that the resultant paint film has a desired thickness. The paint film is processed or patterned, if necessary, and then fired so as to complete the thermal decomposition of the organic component (i.e., remove the binder). The paint film thus turns to an insulating film. In the case where the paint for forming an insulating film has a poor wettability to the surface to be coated with the paint, crawling occurs between the paint and the surface coated with the paint, which leads to the generation of voids and/or pin-holes in the paint film and to the separation of the paint film due to the insufficient adhesion between the paint and the surface. Therefore, to prevent the generation of voids and/or pin-holes and the separation of the paint film, it is important that the paint has a good wettability to the surface to be coated with the paint. Since the wettability of the paint to the surface to be coated with the paint primarily is influenced by the wettability of the solvent to the surface, it is necessary that the solvent has a good wettability to the material of the surface to be coated with the paint. On this account, it is preferable that the solvent forms a contact angle of less than 5° with the inorganic material.

The contact angle can be determined according to a known method with the use of a contact angle measurement device or the like.

Also, the paint for forming an insulating film according to the present invention preferably is used for forming partition walls provided on a back plate of a plasma display panel. Typically, the partition walls are formed on a back dielectric layer serving as an address-electrode protective film, and the back dielectric layer is a glass thin film or a ceramic thin film. Thus, it is necessary that the paint for forming an insulating film has a good wettability to glass and ceramic. In particular, it is preferable that the solvent contained in the paint forms a contact angle of less than 5° with glass and ceramic.

The method of forming the partition walls by the patterning of the paint is not specifically limited. For example, patterning by screen printing may be performed repeatedly, or a pattern may be etched by sandblasting after the paint has been coated on the entire surface of the back dielectric layer by screen printing or die coating. When the solvent forms a contact angle of 5° or more with glass and ceramic, the paint has a poor wettability to the back dielectric layer, which is a surface to be coated with the paint. This may lead to the problems such that the resultant partition walls collapse due to the voids generated inside the partition walls and the paint film is etched unevenly by sandblasting.

Further, the paint for forming an insulating film according to the present invention preferably is used for forming a dielectric layer and a protective film used in a plasma display panel or a plasma address liquid crystal display; and an interlayer insulating film for insulation of element electrodes and upper and lower wirings used in an image forming apparatus using electron-emitting elements. These layers and film are formed on glass substrates such as lead glass and a blue glass plate and on metal electrodes such as silver (Ag) electrodes and ceramic electrodes such as ITO (indium tin oxide) electrodes formed on the glass substrates. In some cases, the glass substrates include black stripes to improve contrast. The black stripe is mostly a mixture (compound) of ceramic black pigment and glass powder. Thus, it is necessary that the paint for forming an insulating film has a good wettability to glass, a metal compound, and ceramic. In particular, it is preferable that the solvent contained in the paint forms a contact angle of less than 5° with glass, a metal compound, and ceramic. When the solvent forms a contact angle of 5° or more with glass, a metal compound, and ceramic, the paint has a poor wettability to the glass substrate and the electrodes, and voids and/or cavities are generated in the paint film due to the incorporation of air bubbles at the time of coating.

The solvent (c) used in the paint for forming an insulating film according to the present invention is not specifically limited as long as it forms a contact angle of less than 5° with an inorganic material. Examples of usable solvents include diethyl carbitol, dipropylene glycol-n-propyl ether, tripropylene glycol monomethyl ether, diethyl cellosolve, carbitol acetate, dibutyl cellosolve, and propylene glycol diacetate. These solvents may be used alone or in combination.

In general, when a solvent contains two or more organic solvents, the wettability of the solvent strongly is affected by the proportion of the organic solvents. For example, when a solvent with a good wettability to the glass substrate and a solvent with a poor wettability to the same are mixed with each other, the wettability of the resultant mixed solvent increases in keeping with the proportion of the solvent with a good wettability. The above-mentioned seven organic solvents form a contact angle of less than 5° with glass, ceramic, and a metal compound, and thus have an excellent wettability to the above-mentioned inorganic material. Thus, these solvents have a good wettability not only to the glass substrate but also to a composite substrate such as a glass substrate including metal electrodes and the like formed thereon. Therefore, it is more preferable that the paint for forming an insulating film contains 50 wt. % or more of at least one solvent selected from the above-mentioned seven solvents to improve the wettability of the paint to the surface to be coated with the paint and prevent the generation of voids and/or pin-holes.

Further, the solvent (c) further may contain a solvent other than the above-mentioned seven solvents as long as the resultant mixed solvent can produce the effect of the invention. Examples of the solvent that can be mixed with the above-mentioned seven solvents include terpenes such as α-, β-, and γ-terpineols; ethylene glycol monoalkyl ethers; ethylene glycol dialkyl ethers; diethylene glycol monoalkyl ethers; diethylene glycol dialkyl ethers; ethylene glycol monoalkyl ether acetates; ethylene glycol dialkyl ether acetates; diethylene glycol monoalkyl ether acetates; diethylene glycol dialkyl ether acetates; propylene glycol monoalkyl ethers; propylene glycol dialkyl ethers; propylene glycol monoalkyl ether acetates; propylene glycol dialkyl ether acetates; dipropylene glycol monoalkyl ethers; dipropylene glycol dialkyl ethers; dipropylene glycol monoalkyl ether acetates; dipropylene glycol dialkyl ether acetates; tripropylene glycol monoalkyl ethers; tripropylene glycol dialkyl ethers; tripropylene glycol trialkyl ethers; tripropylene glycol monoalkyl ether acetates; inpropylene glycol dialkyl ether acetates; tripropylene glycol trialkyl ether acetates; and alcohols such as methanol, ethanol, isopropanol, and 1-butanol. These solvents may be used alone or in combination of two or more types.

Among these, it is preferable to use as the solvent (c) at least two solvents selected from diethyl carbitol, dipropylene glycol-n-propyl ether, tripropylene glycol monomethyl ether, and diethyl cellosolve. The reason for this is that these four solvents have a good wettability to glass, ceramic, and a metal compound regardless of whether ultraviolet cleaning is performed or not. In addition, these four solvents can be prepared at low cost. Further, these four solvents differ in boiling points by at least 10° C. (diethyl cellosolve has the lowest boiling point of 121° C. and tripropylene glycol monomethyl ether has the highest boiling point of 242° C.), and also differ in drying rates. Therefore, by using at least two of these solvents in combination, the solvent component is prevented from being abruptly volatilized from the paint film during drying. As a result, the generation of voids and/or pin-holes inside the dried paint film is suppressed and the surface of the dried paint film is prevented from being rough.

When preparing the paint for forming an insulating film according to the present invention, the proportion of the solvent (c) in the paint preferably is 4 to 85 wt. %, more preferably 5 to 60 wt. %, and most preferably 10 to 40 wt. %. When the paint contains less than 4 wt. % of the solvent (c), the flowability of the paint is made lower to degrade the ease of coating. On the other hand, when the paint contains more than 85 wt. % of the solvent (c), the paint film shrinks greatly during drying, which may leads to the occurrence of defects and also to high cost.

The inorganic fine particles (a) as an inorganic component contained in the paint for forming an insulating film according to the present invention are not specifically limited. Any known inorganic compounds capable of forming an insulating film can be used as the inorganic fine particles (a). Among these, metal oxides preferably are used. In particular, metal oxides such as $SiO_2$, $ZnO$, $B_2O_3$, $PbO$, $Bi_2O_3$, $BaO$, $P_2O_5$, $CaO$, $SrO$, and $MgO$ are preferable. Low melting point glass generally used as an insulating film is formed using glass powder containing at least two of these oxides. In particular, glass powder containing PbO as a main component preferably is used because of its ease of control, e.g., ease of softening-point adjustment. Therefore, by adding the above fine particles to the paint for forming an insulating film, insulation performance of the paint can be improved. These inorganic fine particles may be used alone or in combination.

The inorganic fine particles (a) preferably have an average particle diameter of 0.1 to 10 μm, more preferably 0.3 to 7 μm, and most preferably 0.5 to 5 μm. When the inorganic fine particles (a) have an average particle diameter of less than 0.1 μm, the fine particles have high cohesion and the paint film is likely to have defects. On the other hand, when the inorganic fine particles (a) have an average particle diameter of more than 10 μm, the filling rate of the fine particles inside the paint film is made lower and the paint film is likely to have defects.

When preparing the paint for forming an insulating film according to the present invention, the proportion of the inorganic fine particles (a) in the paint preferably is 10 to 95 wt. %, more preferably 40 to 90 wt. %, and most preferably 60 to 80 wt. %. When the paint contains less than 10 wt. % of the inorganic fine particles (a), the paint film suffers a great loss during drying and firing, resulting in high cost. On the other hand, when the paint contains more than 95 wt. % of the inorganic fine particles (a), the flowability of the paint is reduced and affects the ease of coating.

The binder resin (b) contained in the paint for forming an insulating film according to the present invention is not specifically limited. Any conventionally known binder resin that can serve as a binder of the inorganic fine particles can be used as the binder resin (b). By the use of the binder resin, inorganic fine particles can be dispersed in an organic solvent uniformly so that the paint film obtained after the paint has been coated and dried is prevented form being out of shape.

Examples of preferable binder resins include cellulosic resins such as nitrocellulose, ethyl cellulose, and hydroxyethyl cellulose; acrylic resins such as polybutyl acrylate and polymethacrylate and copolymers thereof, polyvinyl alcohol; and polyvinyl butyral. In the paint for forming an insulating film, the binder resins may be used alone or in combination of two or more types.

When preparing the paint for forming an insulating film according to the present invention, the proportion of the binder resin (b) in the paint preferably is 0.1 to 20 wt. %, more preferably 0.5 to 10 wt. %, and most preferably 1 to 5 wt. %. When the paint contains less than 0.1 wt. % of the binder resin, the paint film (dry film) cannot preserve its form and thus loses its shape On the other hand, when the paint contains more than 20 wt. % of the binder resin, the paint film suffers a great loss during firing, and the paint film becomes more likely to have defects.

The paint for forming an insulating film according to the present invention may further contain as a filler (d) at least one selected from ceramic such as titania, alumina, barium titanate, and zirconia; and high melting point glass. These fillers reduce the rate of shrinkage during firing upon reducing the thermal expansion coefficient, thereby reducing the stress applied onto the substrate. In particular, when the paint contains a white filler, a plasma display panel that can display an image having a high luminance can be obtained because the white filler improves the reflection of display light. The amount of the filler (d) in the paint is not specifically limited as long as the paint can perform its function. However, in general, the proportion of the filler (d) in the paint preferably is 1 to 20 wt. %, more preferably 2 to 10 wt. % from the viewpoint of controlling the thermal expansion coefficient.

The above-mentioned glass to be used as the inorganic fine particles are in powder forms because they generally are synthesized by quenching and pulverizing molten glass compounds. Accordingly, the paint can be prepared by mixing at least the powdered glass; an organic solvent for dispersing the powdered glass; and a resin as a binder for uniformly dispersing the powdered glass in the organic solvent as well as preventing the paint film obtained after the paint has been coated and dried from losing its shape.

By firing the thus prepared paint after it has been coated and dried, a desired insulating film is obtained. The organic solvent as a dispersion medium is volatilized during drying, the resin as a binder is volatilized during firing, and only the glass component is left. The organic solvent as a dispersion medium and the resin as a binder are necessary to enable the use of inexpensive coating-type forming methods when forming an insulating film using glass powder.

Therefore, as stated above, material that form glass when fired preferably are used as an inorganic component such as the inorganic fine particles (a) and the filler (d) in the paint for forming an insulating film according to the present invention.

Further, the paint for forming an insulating film according to the present invention may contain a dispersing agent, a plasticizer, a viscosity modifier, an oligomer, a polymer, an ultraviolet absorber, a photosensitive monomer, a photoinitiator, a sensitizer, etc., if necessary. Examples of the dispersing agent include dibutylphthalate, dioctyl phthalate, polyethylene glycol, and glycerin. Examples of the viscosity modifier include thixotropic agents such as an aerosil. The proportion of these additives in the paint is not specifically limited as long as the paint can perform its function. However, in general, the proportion of the additives in the paint is preferably 0.01 to 20 wt. % and more preferably 0.1 to 5 wt. % from the viewpoint of preventing the occurrence of defects during firing.

The paint for forming an insulating film according to the present invention can be prepared as follows, for example: various components such as inorganic particles, a binder resin, a solvent, a dispersing agent, a plasticizer, an oligomer, a polymer, an ultraviolet absorber, a photosensitive monomer, a photoinitiator, a sensitizer, and other additives and solvent are mixed with each other to give a mixture having a desired composition, and these component are dispersed uniformly by a dispersing machine such as a three-roller mill, a ball mill, and a sand mill.

The paint for forming an insulating film according to the present invention suitably is used for forming an insulating film used in a plasma display panel, a plasma address liquid crystal display, or an image forming apparatus using electron-emitting elements.

Hereinafter, a method of forming a back plate of a plasma display panel of the invention with the use of a paint for forming an insulating film of the invention will be explained with reference to FIG. 1.

A back plate of a plasma display panel typically includes a back glass substrate 2 on which address electrodes 5, a back dielectric layer 8 as a protective film, partition walls 9, and phosphors 6 are formed. Accordingly, when manufacturing the back plate, the address electrodes 5 are formed on the back glass substrate 2, in the first place. As an electrode material, a metal compound such as Ag, Cr—Cu—Cr, or the like preferably is used on account of the resistance, adherence to the glass substrate, etc. Further, when the electrode material contains a small amount of glass component, address electrodes having excellent adherence to the glass substrate can be obtained.

First, on the back glass substrate 2 with the address electrodes 5 formed thereon, a back dielectric layer 8 as an address electrode protective film is formed using a paint for forming an insulating film according to the preset invention. Specifically, the paint is coated onto the glass substrate 2 to form a dielectric paint film having a thickness of 5 to 30 $\mu$m so that the thickness of the film becomes 2 to 10 $\mu$m after firing. Then, by firing the dielectric paint film, the back dielectric layer 8 as an address-electrode protective film is obtained.

The coating of the paint can be performed by the methods generally utilized, e.g., screen printing, bar coating, roll coating, die coating, and doctor blade. An atmosphere in which the firing performed and a firing temperature are determined depending on the characteristics of the paint and the substrate. However, it is preferable to perform the firing in air or a nitrogen atmosphere. As a furnace, a batch-type or belt-type furnace or a walking-beam-type continuous furnace can be used. The firing temperature is not specifically limited. However, the firing typically is performed at a temperature of 400 to 600° C.

Further, as described above, in the case where the dielectric paint film is formed by coating the paint for forming an insulating film, ultraviolet cleaning preferably is performed before coating the paint onto the substrate. Ultraviolet cleaning is a method of removing organic dirt on the glass substrate and the electrodes. The organic compounds composing the dirt are gasified upon being decomposed and oxidized by the energy of ultraviolet rays and $O_3$ generated by the ultraviolet rays until they finally become $CO_2$ and $H_2O$. Since the organic dirt on the glass substrate and the electrodes is removed by ultraviolet cleaning, the wettability of the paint to the glass substrate and the electrodes is made uniform on the substrate, thereby suppressing crawling due to the non-uniformity of the wettability on the surface of the substrate.

An organic component contained in the paint for forming an insulating film may be photosensitive, and the back dielectric layer 8 can be obtained by forming a dielectric paint film by a method such as an entire exposure process and firing it.

Next, on the back plate of a plasma display panel with the back dielectric layer 8 formed thereon, the partition walls 9 are formed using the paint for forming an insulating film according to the present invention. Specifically, the paint is coated onto the glass substrate 2 to form a dielectric paint film having a thickness of 300 to 600 $\mu$m so that the thickness of the film becomes 100 to 200 $\mu$m after firing. A patterned protective film is attached to the dielectric paint film and a portion that is not protected by the protective film is etched by sandblasting. Then, by firing the dielectric paint film after the protective film is removed, the partition walls 9 are obtained.

When forming the partition walls 9, the coating and the firing of the paint can be performed by the methods generally utilized, as in the case of forming the back dielectric layer 8.

Also, as in the case of forming the back dielectric layer 8, ultraviolet cleaning preferably is performed before coating the paint onto the substrate. By performing the ultraviolet cleaning, the wettability of the paint to the back dielectric layer 8 is made uniform on the substrate, thereby suppressing the crawling due to the non-uniformity of the wettability on the surface of the substrate.

An organic component contained in a paint for forming an insulating film may be photosensitive, and the partition walls 9 can be obtained by forming a dielectric paint film by photolithography such as pattern exposure and firing it. The photolithography is preferable because it can provide high-definition partition walls 9 with a high aspect ratio.

Further, the back plate of the plasma display panel can be manufactured by firing the back dielectric layer 8 and the partition walls 9 simultaneously, instead of firing them separately as described above.

As specifically described above, by the method of manufacturing a back plate of a plasma display panel according to the present invention, the back dielectric layer 8 and the partition walls 9 can be manufactured with a high yield.

Further, the back plate of a plasma display panel obtained by the manufacturing method of the invention can be used suitably because it includes an insulating film having few voids and/or pin-holes and thus produces an excellent insulating effect.

In the following, a method of forming a front plate of a plasma display panel of the invention with the use of a paint for forming an insulating film of the invention will be explained with reference to FIG. 1.

As described above, a front plate of a plasma display panel typically includes a front glass substrate 1; transparent electrodes 4 formed on the glass substrate 1; two display electrodes formed on each transparent electrode 4; a front dielectric layer 7 covering them; and an MgO film 10 as a protective film.

The front dielectric layer 7 is provided for preventing leakage from occurring between the respective display electrodes 3 and between the display electrodes 3 and the address electrodes 5. Thus, it is necessary that the front dielectric layer 7 produce a desired insulating effect. However, unlike the partition walls 9 provided on the back glass substrate 2, the front dielectric layer 7 need not be patterned. Conversely, the front dielectric layer (7) should be a flat thin film having a high transparency to suppress irregularity of the display. Accordingly, the front dielectric layer 7 can be obtained by coating the paint for forming an insulating film by printing, and then drying and firing the paint.

First, the transparent electrodes 4, which generally are formed of ITO, are formed on the front glass substrate 1 by sputtering or the like. Subsequently, the transparent electrodes 4 are patterned by screen printing or photolithography and then fired to form display electrodes 3. As the electrode material, the same material as used for forming the address electrodes 5 can be used. It is to be noted here that the transparent electrodes 4 are not always necessary, and the display electrodes 3 may be formed directly on the front glass substrate 1.

Next, the paint for forming an insulating film according to the present invention is coated onto the front glass substrate 1 to form a dielectric paint film having a thickness of 30 to 150 μm so that the thickness of the film becomes 10 to 50 μm after firing. Then, by firing the dielectric paint film, the front dielectric layer 7 is obtained. The coating and the firing of the paint can be performed by the methods generally utilized, as in the case of forming the back dielectric layer 8 and the partition walls 9.

Also, as in the case of forming the back dielectric layer 8 and the partition walls 9, ultraviolet cleaning preferably is performed before coating the paint onto the substrate. By performing the ultraviolet cleaning, the wettability of the paint to the front glass substrate 1 and the transparent electrodes 4 is made uniform on the substrate, thereby suppressing the crawling due to the non-uniformity of the wettability on the surface of the substrate.

An organic component contained in a paint for forming an insulating film may be photosensitive, and the front dielectric layer 7 can be obtained by forming a dielectric paint film by photolithography such as pattern exposure and firing it.

The front plate of a plasma display panel obtained by the manufacturing method of the invention can be used suitably because it includes an insulating film having few voids and/or pin-holes and thus produces an excellent insulating effect.

Hereinafter, the present invention will be explained in further detail with reference to examples. However, it is to be noted that the present invention is not limited to these examples. In the examples, "%" means "wt. %" unless otherwise stated.

EXAMPLE

Examples 1–6 and Comparative Examples 1 and 2

Wettabilities of the organic solvents shown below were evaluated by measuring their contact angles with various substrates formed of an inorganic material. As the substrates formed of an inorganic material, there were used a glass substrate (PD-200: Asahi Glass Company, Ltd.) and glass substrates on the entire surfaces of which ITO, Ag, Cu, and Cr are evaporated, respectively. Further, ultraviolet (hereinafter, referred to as "UV") cleaning was performed on glass substrates of the same type after electrodes had been formed thereon, and contact angles of the organic solvents with these substrate also were measured.

Example 1: diethyl carbitol (diethylene glycol dithyl ether)
Example 2: dipropylene glycol-n-propyl ether
Example 3: tripropylene glycol monomethyl ether
Example 4: diethyl cellosolve (ethylene glycol diethyl ether)
Example 5: carbitol acetate (diethylene glycol monoethyl ether acetate)
Example 6: dibutyl cellosolve (ethylene glycol dibutyl ether)
Example 7: propylene glycol diacetate
Comparative Example 1: α-terpineol
Comparative Example 2: butyl carbitol acetate (diethylene glycol mono-n-butyl ether acetate)

(Method of Measuring Contact Angle)

Figure 2:
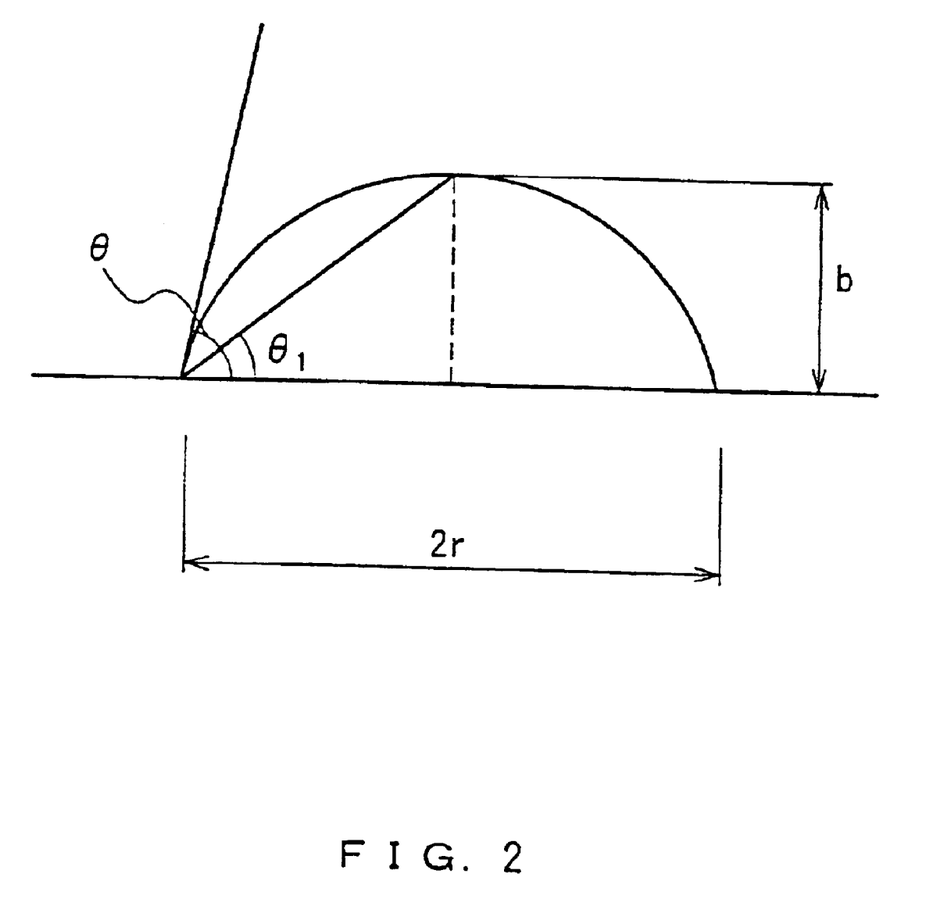
FIG. 2 is a view illustrating a method of measuring a contact angle.

The contact angle was measured using a CA-X type contact angle measuring instrument (available from Kyowa Interface Science Co., Ltd.). Sample liquid droplets were dispensed from a syringe, the length between the top of the syringe and the end of each liquid droplet being given so that each sample liquid droplet had the same volume. A certain amount of each sample liquid droplet was dispensed onto the substrate to form a liquid droplet on the substrate. Then, after 5 seconds, the contact angle of the liquid droplet was measured on a magnifying monitor. The contact angle is the value obtained as follows: the height from the substrate to the top of the liquid droplet (h) and the length of the interface between the liquid droplet and the substrate were measured as shown in FIG. 2, and based on Height/Width method, the contact angle was calculated using the following equation.

$$\tan\theta_1 = h/r, \text{ contact angle } \theta = 2\theta_1$$

The results of the measurement are shown in Table 1. Table 1 shows an average value of the values obtained by measuring each contact angle for five times. However, in the case where the measured value varied greatly, the range of the variation is shown instead of the average value.

(Evaluation of Breakdown Voltage)

The insulation performance (breakdown voltage) of dielectric layers obtained by coating the respective paints for forming an insulating film was determined in the following manner.

TABLE 1

|  |  |  | Example | | | | | | | Comparative Example | |
|---|---|---|---|---|---|---|---|---|---|---|---|
| Example No. | | | 1 | 2 | 3 | 4 | 5 | 6 | 7 | 1 | 2 |
| contact angle | glass substrate | untreated | <5° | <5° | <5° | <5° | 0°–8° | 8.3° | 10.5° | 14.1° | 8.1° |
|  |  | UV-treated | <5° | <5° | <5° | <5° | <5° | <50 | <5° | 17.0° | 12.8° |
|  | ITO film | untreated | <5° | <5° | <5° | <5° | 0°–10° | <5° | 7.6° | 6.2° | <5° |
|  |  | UV-treated | <5° | <5° | <5° | <5° | <5° | <5° | <5° | 5.9° | <5° |
|  | Ag sputtered film | untreated | <5° | <5° | <5° | <5° | 0°–10° | <5° | 20.8° | <5° | <5° |
|  |  | UV-treated | <5° | <5° | <5° | <5° | <5° | <5° | <5° | <5° | <5° |
|  | Cu sputtered film | untreated | <5° | <5° | <5° | <5° | 0°–9° | <5° | 19.4° | <5° | <5° |
|  |  | UV-treated | <5° | <5° | <5° | <5° | <5° | <5° | <5° | <5° | <5° |
|  | Cr sputtered film | untreated | <5° | <5° | <5° | <5° | 0°–10° | <5° | 17.3° | <5° | <5° |
|  |  | UV-treated | <5° | <5° | <5° | <5° | <5° | <5° | <5° | <5° | <5° |
| breakdown voltage | Ag electrode | untreated | 1.8 kV | 1.7 kV | 1.8 kV | 1.7 kV | 1.3 kV | 0.9 kV | 0.4 kV | 0.6 kV | 0.6 kV |
|  |  | UV-treated | 1.9 kV | 1.8 kV | 1.9 kV | 1.8 kV | 1.8 kV | 1.6 kV | 1.7 kV | 0.5 kV | 0.6 kV |
|  | Cr—Cu—Cr electrode | untreated | 1.6 kV | 1.7 kV | 1.7 kV | 1.6 kV | 1.2 kV | 0.9 kV | 0.4 kV | 0.4 kV | 0.6 kV |
|  |  | UV-treated | 1.7 kV | 1.8 kV | 1.7 kV | 1.6 kV | 1.8 kV | 1.7 kV | 1.7 kV | 0.6 kV | 0.6 kV |
|  | Ag electrode + ITO electrode | untreated | 1.7 kV | 1.7 kV | 1.7 kV | 1.8 kV | 1.4 kV | 1.0 kV | 0.3 kV | 0.4 kV | 0.6 kV |
|  |  | UV-treated | 1.7 kV | 1.8 kV | 1.8 kV | 1.7 kV | 1.6 kV | 1.7 kV | 1.6 kV | 0.5 kV | 0.6 kV |
|  | Cr—Cu—Cr electrode + ITO electrode | untreated | 1.6 kV | 1.7 kV | 1.8 kV | 1.7 kV | 1.4 kV | 0.8 kV | 0.3 kV | 0.5 kV | 0.5 kV |
|  |  | UV-treated | 1.6 kV | 1.8 kV | 1.8 kV | 1.7 kV | 1.7 kV | 1.6 kV | 1.6 kV | 0.4 kV | 0.6 kV |
| effect of protecting address electrode | | untreated | ○ | ○ | ○ | ○ | ○ | X | X | X | X |
|  | | UV-treated | ○ | ○ | ○ | ○ | ○ | ○ | ○ | X | X |
| effect as partition walls | | untreated | ○ | ○ | ○ | ○ | Δ | X | X | X | X |
|  | | UV-treated | ○ | ○ | ○ | ○ | ○ | ○ | ○ | X | X |

As shown in Table 1, although the solvents used in Comparative Examples 1 and 2, which are the solvents used in a currently used paint for forming an insulating film, had a good wettability to the metal compounds like Ag, Cu, and Cu, α-terpineol used in Comparative Example 1 had a somewhat poor wettability to the ceramic like ITO and still poorer wettability to the glass substrate. The same results were obtained with respect to the UV-treated substrates.

On the other hand, the solvents used in Examples 1 to 4 had an excellent wettability to the glass substrate, metal compounds, and ceramic. The same results were obtained with respect to the UV-treated substrates.

The contact angles of the solvent used in Example 5 with the untreated substrate slightly varied depending on where the measurements were made on the substrates. However, the solvent had a good wettability to any portion of the UV-treated substrate.

The solvents used in Examples 6 and 7 had a poor wettability to the glass substrate, metal compounds, and ceramic in some measurements when UV cleaning was not performed on the substrate. However, by performing the UV cleaning on the substrates, the wettability to the substrates was greatly improved and variation in the contact angles was eliminated.

(Preparation of Paint for Forming Insulating Film)

Using the solvents that contain 100% of the organic solvents used in the above-mentioned contact angle measurement, paints for forming an insulating film were prepared so as to have the following composition ratio according to the following method: 200 g of vehicle (the solvent containing a resin dissolved therein) containing 10% of ethyl cellulose ("Ethocel STD-7" available from Dow Chemical Company, polymerization degree: 60,000) and 300 g of a lead oxide glass frit ($PbO$—$MgO$—$B_2O_3$—$SiO_2$) having an average particle diameter of 3 μm were pre-mixed with each other, and then mixed with the three-roller mill to prepare a paint for forming an insulating film.

A filing-type Ag paste was printed onto a glass substrate (PD-200) and then fired at 590° C. to form lower electrodes. Then, the paint for forming an insulating film according to the present invention was printed over the glass substrate so that ends of the lower electrodes were exposed. The paint was then fired at 590° C. The printing conditions were adjusted so that the thickness of the dielectric layer would be 30 μm after firing. Subsequently, a thermosetting-type Ag paste further was coated in such a manner that the Ag paste came within the area of the lower electrodes. The Ag paste thus coated was heated at 150° C. to form upper electrodes. The breakdown voltage was measured using a breakdown voltage measuring instrument (Kikusui Electronics Corp.), which was connected to the dielectric layer via the contacts provided in the ends of each one of the lower electrodes and upper electrodes, respectively, so as to oppose each other. The moment when the leakage current of 0.5 mA occurred was regarded as dielectric breakdown, and the voltage at this time was measured as a breakdown voltage. The breakdown voltage of the dielectric layer formed on Cr—Cu—Cr electrodes also was measured in the same manner.

Further, a glass substrate (PD-200) that includes, as ground electrodes for Ag electrodes (lower electrodes), ITO electrodes of 2 μm thickness formed through pattern formation by spattering and Ag electrodes (lower electrodes) formed on the ITO electrodes in the above manner was also prepared. Then, a dielectric layer was formed on this substrate using the paint for forming an insulating film of the invention and upper electrodes were formed using a thermosetting-type Ag paste in the same manner as above. The breakdown voltage of the dielectric layer was measured in the same manner as above. Further, the breakdown voltage of the dielectric layer when Cr—Cu—Cr electrodes were formed instead of the Ag electrodes also was measured in the same manner.

The results of the measurement also are shown in Table 1.

As is apparent from Table 1, the dielectric layers formed using the paints of Examples 1 to 4 had no voids or pin-holes and had excellent voltage endurance characteristics.

The dielectric layer formed using the paint of Example 5 had no voids or pin-holes and had voltage endurance characteristics sufficient for practical use even when formed on the untreated substrates. The dielectric layer had further improved in voltage endurance characteristics when UV cleaning had been performed on the substrates.

The dielectric layers formed using the paints of Examples 6 and 7 had insufficient voltage endurance characteristics when formed on the untreated substrates. However, these dielectric layers had voltage endurance characteristics sufficient for practical use when UV cleaning had been performed on the substrates.

On the other hand, the dielectric layers formed using the paints of Comparative Examples 1 and 2 had voids and/or pin-holes, and had voltage endurance characteristics somewhat inferior to those of the dielectric layers of Examples 1 to 7.

(Evaluation of Effect of Protecting Address Electrodes)

Next, with respect to the insulating film formed using the paints, effects as address electrode protective films were evaluated. A firing-type Ag paste was printed onto a glass substrate (PD-200) and then fired at 590° C. to form lower electrodes. Then, the paint for forming an insulating film according to the present invention was printed on the entire surface of the glass substrate so that the thickness of the paint film would be 3 μm after firing. The paint film then was fired at 590° C. The insulating film thus obtained was formed by coating the paint once. The results are shown in Table 1.

The effect of protecting address electrodes was evaluated based on the following criteria.

◯: The address electrode protective film had no voids or pin-holes.

x: The address electrode protective film had voids and/or pin-holes.

As is apparent from Table 1, the address electrode protective films formed using the paints of Examples 1 to 5 had no defects such as voids or pin-holes and had a sufficient effect as a protective film.

The address electrode protective films formed using the paints of Examples 6 and 7 had voids and/or pin-holes when formed on the untreated substrates and had an insufficient effect as a protective film. However, these address electrode protective films had no voids or pin-holes when formed on the UV-treated substrate and had a sufficient effect as a protective film.

On the other hand, the address electrode protective films formed using the paints of Comparative Examples 1 and 2 had voids and/or pin-holes, and had an insufficient effect as a protective film.

(Evaluation of Effect as Partition Walls)

The paint for forming an insulating film according to the present invention was printed onto a glass substrate (PD-200) so that the thickness of the paint film would be 200 μm after firing, followed by drying. The paint film was then covered with a pattered protective film, and the pattern of partition walls was etched by sandblasting. After the protective film has been removed, the glass substrate was fired at 590° C. to form partition walls. The results of the evaluation are shown in Table 1.

The partition walls were evaluated based on the following criteria.

◯: The partition walls had no voids or pin-holes, and were not separated from the glass substrate.

Δ: The partition walls had no voids or pin-holes, but were separated from the glass substrate.

x: The partition walls had voids and/or pin-holes, and were separated from the glass substrate.

As is apparent from Table 1, the partition walls formed using the paints of Examples 1 to 4 had no defects such as voids or pin-holes, and a portion of the partition walls was not separated from the glass substrate.

The partition walls formed using the paint of Example 5 had no voids or pin-holes, but they were separated from the glass substrate in some cases. However, the occurrence of the separation of the partition walls was suppressed when UV cleaning had been performed on the glass substrate.

The partition walls formed using the paints of Examples 6 and 7 had voids and/or pin-holes and were separated from the glass substrate, in some cases, when formed on the untreated substrates. However, the partition walls had no voids or pin-holes and were not separated from the substrates when formed on the UV-treated substrates, and thus had a sufficient effect as partition walls.

On the other hand, in the partition walls formed using the paints of Comparative Examples 1 and 2, voids and/or pin-holes were generated, a region where no partition wall was formed was generated, and a portion of the partition walls was separated from the glass substrate.

TABLE 2

|  | DCr | CrAc | BCA |
|---|---|---|---|
| Example 8 | 3 |  | 1 |
| Example 9 | 1 |  | 1 |
| Comparative Example 3 | 1 |  | 3 |
| Example 10 |  | 3 | 1 |
| Example 11 |  | 1 | 1 |
| Comparative Example 4 |  | 1 | 3 |

TABLE 3

|  |  |  | Example | | | | Comparative Example | |
|---|---|---|---|---|---|---|---|---|
| | | Example No. | 8 | 9 | 10 | 11 | 3 | 4 |
| contact angle | glass substrate | untreated | <5° | <5° | 0°–7° | 0°–10° | 8.4° | 11.3° |
| | | UV-treated | <5° | <5° | <5° | <5° | 7.6° | 13.2° |
| | ITO film | untreated | <5° | <5° | <5° | <5° | <5° | <5° |
| | | UV-treated | <5° | <5° | <5° | <5° | <5° | <5° |
| | Ag sputtered film | untreated | <5° | <5° | <5° | <5° | <5° | <5° |
| | | UV-treated | <5° | <5° | <5° | <5° | <5° | <5° |
| | Cu sputtered film | untreated | <5° | <5° | <5° | <5° | <5° | <5° |
| | | UV-treated | <5° | <5° | <5° | <5° | <5° | <5° |
| | Cr sputtered film | untreated | <5° | <5° | <5° | <5° | <5° | <5° |
| | | UV-treated | <5° | <5° | <5° | <5° | <5° | <5° |
| breakdown voltage | Ag electrode | untreated | 1.8 kV | 1.7 kV | 1.3 kV | 1.2 kV | 0.8 kV | 0.5 kV |
| | | UV-treated | 1.8 kV | 1.8 kV | 1.7 kV | 1.8 kV | 0.7 kV | 0.5 kV |

TABLE 3-continued

|  |  | Example | | | | Comparative Example | |
|---|---|---|---|---|---|---|---|
| Example No. |  | 8 | 9 | 10 | 11 | 3 | 4 |
| Cr—Cu—Cr electrode | untreated | 1.7 kV | 1.7 kV | 1.3 kV | 1.2 kV | 0.7 kV | 0.5 kV |
|  | UV-treated | 1.7 kV | 1.8 kV | 1.6 kV | 1.6 kV | 0.7 kV | 0.4 kV |
| Ag electrode + ITO electrode | untreated | 1.6 kV | 1.6 kV | 1.4 kV | 1.2 kV | 0.7 kV | 0.5 kV |
|  | UV-treated | 1.6 kV | 1.8 kV | 1.8 kV | 1.8 kV | 0.7 kV | 0.5 kV |
| Cr—Cu—Cr electrode + ITO electrode | untreated | 1.6 kV | 1.7 kV | 1.4 kV | 1.2 kV | 0.7 kV | 0.5 kV |
|  | UV-treated | 1.6 kV | 1.7 kV | 1.7 kV | 1.7 kV | 0.7 kV | 0.5 kV |
| effect of protecting address electrode | untreated | ○ | ○ | ○ | ○ | X | X |
|  | UV-treated | ○ | ○ | ○ | ○ | X | X |
| effect as partition wall | untreated | ○ | ○ | Δ | Δ | X | X |
|  | UV-treated | ○ | ○ | ○ | ○ | Δ | X |

Examples 8 to 11 and Comparative Examples 3 and 4

Wettabilities of the mixed solvents obtained by mixing the organic solvents in the ratio shown in Table 2 were evaluated in the same manner as in Examples 1 to 7 and Comparative Examples 1 and 2. In Table 2, DCr denotes diethyl carbitol; CrAc denotes carbitol acetate; and BCA denotes butyl carbitol acetate. Paints for forming an insulating film were prepared and the breakdown voltage, the effect of protecting address electrodes, and the effect as; partition walls were evaluated in the same manner as in Examples 1 to 7 and Comparative Examples 1 and 2. The results are shown in Table 3.

As is apparent from Table 3, the dielectric layers formed using the paints of Examples 8 and 9 had no voids or pin-holes and had excellent voltage endurance characteristics.

The dielectric layers formed using the paint of Examples 10 and 11 had no voids or pin-holes and had voltage endurance characteristics sufficient for practical use even when formed on the untreated substrates. These dielectric layers had further improved in voltage endurance characteristics when UV cleaning had been performed on the substrates.

On the other hand, the dielectric layers formed using the paints of Comparative Examples 3 and 4 had voids and/or pin-holes, and had voltage endurance characteristics somewhat inferior to those of the dielectric layers of Examples 8 to 11.

Further, regarding the effect of protecting address electrodes, the address electrode protective films formed using the paints of Examples 8 to 11 had no defects such as voids or pin-holes and had a sufficient effect as a protective film, as is apparent from Table 3.

On the other hand, the address electrode protective films formed using the paints of Comparative Examples 3 and 4 had voids and/or pin-holes, and had an insufficient effect as a protective film Further, regarding the effect as partition walls, the partition walls formed using the paints of Examples 8 and 9 had no defects such as voids or pin-holes, and a portion of the partition walls was not separated from the glass substrate, as is apparent from Table 3. Further, the partition walls formed using the paint of Examples 10 and 11 had no voids or pin-holes, but they were separated from the glass substrate in some cases. However, the occurrence of the separation of the partition walls was suppressed when UV cleaning had been performed on the glass substrate.

On the other hand, in the partition walls formed using the paints of Comparative Examples 3 and 4, voids and/or pin-holes were generated, a region where no partition wall was formed was generated, and a portion of the partition walls was separated from the glass substrate.

TABLE 4

|  | DECe | DCr | DPnP | TPM |
|---|---|---|---|---|
| Example 12 | 1 | 1 |  |  |
| Example 13 | 1 |  | 1 |  |
| Example 14 | 1 |  |  | 1 |
| Example 15 |  | 1 | 1 |  |
| Example 16 |  | 1 |  | 1 |
| Example 17 |  |  | 1 | 1 |

Examples 12 to 17

Wettabilities of the mixed solvents obtained by mixing the organic solvents in the ratio shown in Table 4 were evaluated in the same manner as in Examples 1 to 11 and Comparative Examples 1 to 4. In Table 4, DECe denotes diethyl cellosolve; DCr denotes diethyl carbitol; DPnP denotes dipropylene glycol-n-propyl ether; and TPM denotes tripropylene glycol monomethyl ether. Paints for forming an insulating film were prepared and the breakdown voltage, the effect of protecting address electrodes, and the effect as partition walls were evaluated in the same manner as in Examples 1 to 11 and Comparative Examples 1 to 4. The results are shown in Table 5.

TABLE 5

|  |  |  | Example | | | | | |
|---|---|---|---|---|---|---|---|---|
| Example No. |  |  | 12 | 13 | 14 | 15 | 16 | 17 |
| contact angle | glass substrate | untreated | <5° | <5° | <5° | <5° | <5° | <5° |
|  |  | UV-treated | <5° | <5° | <5° | <5° | <5° | <5° |
|  | ITO film | untreated | <5° | <5° | <5° | <5° | <5° | <5° |
|  |  | UV-treated | <5° | <5° | <5° | <5° | <5° | <5° |
|  | Ag sputtered film | untreated | <5° | <5° | <5° | <5° | <5° | <5° |

TABLE 5-continued

| | | | Example | | | | | |
|---|---|---|---|---|---|---|---|---|
| | Example No. | | 12 | 13 | 14 | 15 | 16 | 17 |
| | Cu sputtered film | UV-treated | <5° | <5° | <5° | <5° | <5° | <5° |
| | | untreated | <5° | <5° | <5° | <5° | <5° | <5° |
| | Cr sputtered film | UV-treated | <5° | <5° | <5° | <5° | <5° | <5° |
| | | untreated | <5° | <5° | <5° | <5° | <5° | <5° |
| | | UV-treated | <5° | <5° | <5° | <5° | <5° | <5° |
| breakdown voltage | Ag electrode | untreated | 2.0 kV | 2.1 kV | 2.2 kV | 2.2 kV | 2.3 kV | 2.3 kV |
| | | UV-treated | 2.0 kV | 2.2 kV | 2.2 kV | 2.3 kV | 2.3 kV | 2.3 kV |
| | Cr—Cu—Cr electrode | untreated | 1.9 kV | 2.0 kV | 2.1 kV | 2.2 kV | 2.2 kV | 2.3 kV |
| | | UV-treated | 2.0 kV | 2.0 kV | 2.1 kV | 2.2 kV | 2.3 kV | 2.3 kV |
| | Ag electrode + ITO electrode | untreated | 1.9 kV | 2.1 kV | 2.1 kV | 2.3 kV | 1.9 kV | 2.1 kV |
| | | UV-treated | 2.0 kV | 2.2 kV | 2.1 kV | 2.3 kV | 2.1 kV | 2.1 kV |
| | Cr—Cu—Cr electrode + ITO electrode | untreated | 2.0 kV | 2.0 kV | 2.1 kV | 2.0 kV | 2.0 kV | 2.0 kV |
| | | UV-treated | 2.0 kV | 2.2 kV | 2.2 kV | 2.0 kV | 2.0 kV | 2.2 kV |
| effect of protecting address electrode | | untreated | ○ | ○ | ○ | ○ | ○ | ○ |
| | | UV-treated | ○ | ○ | ○ | ○ | ○ | ○ |
| effect as partition wall | | untreated | ○ | ○ | ○ | ○ | ○ | ○ |
| | | UV-treated | ○ | ○ | ○ | ○ | ○ | ○ |

As is apparent from Table 5, the dielectric layers formed using the paints of Examples 12 to 17 had no voids or pin-holes and had excellent voltage endurance characteristics. Further, these solvents were improved in the voltage endurance characteristics as compared with the solvents of Examples 1 to 7 composed of only one solvent and the solvents of Examples 8 to 11 containing the solvents having a poorer wettability.

Further, regarding the effect of protecting address electrodes, the address electrode protective films formed using the paints of Examples 12 to 17 had no defects such as voids or pin-holes and had a sufficient effect as a protective film, as is apparent from Table 5.

Furthermore, as is apparent from Table 5, the partition walls formed using the paints of Examples 12 to 17 had no defects such as voids or pin-holes, and a portion of the partition walls was not separated from the glass substrate, and thus had a sufficient effect as partition walls.

Examples 18 to 24 and Comparative Examples 5 and 6

Using as a glass substrate a blue glass plate (#0050: Matsunami Glass Ind.), contact angles of the inorganic solvents shown below with the blue glass plate were measured in the same manner as in Examples 1 to 7 and Comparative Examples 1 and 2. The contact angles of the respective solvents with the blue glass plate are shown in Table 6.

Example 18: diethyl carbitol (diethylene glycol diethyl ether)
Example 19: dipropylene glycol-n-propyl ether
Example 20: tripropylene glycol monomethyl ether
Example 21: diethyl cellosolve (ethylene glycol diethyl ether)
Example 22: carbitol acetate (diethylene glycol monoethyl ether acetate)
Example 23: dibutyl cellosolve (ethylene glycol dibutyl ether)
Example 24: propylene glycol diacetate
Comparative Example 5: α-terpineol
Comparative Example 6: butyl carbitol acetate (diethylene glycol mono-n-butyl ether acetate)

Paints for forming an insulating film were prepared in the same manner as in Examples 1 to 7 and Comparative Examples 1 and 2. Further, except that the blue glass plate (#0050) was used in place of the glass sheet (PD-200), the breakdown voltage, the effect of protecting address electrodes, and the effect as partition walls were evaluated in the same manner as in Examples 1 to 7 and Comparative Examples 1 and 2. The results are shown in Table 6.

TABLE 6

| | | | Example | | | | | | | Comparative Example | |
|---|---|---|---|---|---|---|---|---|---|---|---|
| | Example No. | | 18 | 19 | 20 | 21 | 22 | 23 | 24 | 5 | 6 |
| contact angle | blue grass plate | untreated | <5° | <5° | <5° | <5° | 40°–7° | 6.9° | 9.8° | 13.5° | 9.4° |
| | | UV-treated | <5° | <5° | <5° | <5° | <5° | <5° | <5° | 18.8° | 11.2° |
| breakdown voltage | Ag electrode | untreated | 1.7 kV | 1.7 kV | 1.8 kV | 1.7 kV | 1.3 kV | 0.9 kV | 0.6 kV | 0.5 kV | 0.6 kV |
| | | UV-treated | 1.8 kV | 1.7 kV | 1.8 kV | 1.8 kV | 1.8 kV | 1.6 kV | 1.6 kV | 0.4 kV | 0.5 kV |
| | Cr—Cu—Cr-electrode | untreated | 1.7 kV | 1.8 kV | 1.7 kV | 1.7 kV | 1.2 kV | 0.8 kV | 0.5 kV | 0.4 kV | 0.6 kV |
| | | UV-treated | 1.8 kV | 1.8 kV | 1.7 kV | 1.7 kV | 1.7 kV | 1.7 kV | 1.6 kV | 0.5 kV | 0.6 kV |
| | Ag electrode + ITO electrode | untreated | 1.7 kV | 1.7 kV | 1.8 kV | 1.7 kV | 1.1 kV | 0.9 kV | 0.7 kV | 0.6 kV | 0.6 kV |
| | | UV-treated | 1.7 kV | 1.8 kV | 1.9 kV | 1.8 kV | 1.6 kV | 1.7 kV | 1.7 kV | 0.5 kV | 0.4 kV |
| | Cr—Cu—Cr electrode + ITO electrode | untreated | 1.7 kV | 1.8 kV | 1.7 kV | 1.7 kV | 1.1 kV | 0.9 kV | 0.7 kV | 0.5 kV | 0.4 kV |
| | | UV-treated | 1.8 kV | 1.8 kV | 1.9 kV | 1.7 kV | 1.7 kV | 1.7 kV | 1.6 kV | 0.3 kV | 0.4 kV |
| effect of protecting address electrode | | untreated | ○ | ○ | ○ | ○ | ○ | X | X | X | X |
| | | UV-treated | ○ | ○ | ○ | ○ | ○ | ○ | ○ | X | X |

TABLE 6-continued

|  |  | Example | | | | | | | Comparative Example | |
|---|---|---|---|---|---|---|---|---|---|---|
| Example No. | | 18 | 19 | 20 | 21 | 22 | 23 | 24 | 5 | 6 |
| effect as partition wall | untreated | ○ | ○ | ○ | ○ | Δ | X | X | X | X |
|  | UV-treated | ○ | ○ | ○ | ○ | ○ | ○ | ○ | X | X |

As shown in Table 6, the solvents of Comparative Examples 5 and 6, which are the solvents used in a currently used paint for forming an insulating film, had a poor wettability to the blue glass plate. The same results were obtained with respect to the UV-treated blue glass plate.

The solvents of Examples 18 to 21 had an excellent wettability to the blue glass plate. The same results were obtained with respect to the UV-treated blue glass plate.

The contact angles of the solvent used in Example 22 with the untreated blue glass plate varied slightly depending on where the measurements were made on the blue glass plate. However, the solvent had a good wettability to any portion of the UV-treated blue glass plate.

The solvents of Examples 23 and 24 had a poor wettability to the untreated blue glass plate, in some cases. However, by performing the UV cleaning on the blue glass plate, the wettability to the blue glass plate was greatly improved and variation in the measured contact angles was eliminated.

As is apparent from Table 6, the dielectric layers formed using the paints of Examples 18 to 21 had no voids or pin-holes and had excellent voltage endurance characteristics.

The dielectric layer formed using the paint of Example 22 had no voids or pin-holes and had voltage endurance characteristics sufficient for practical use even when formed on the untreated blue glass plate. These dielectric layers had further improved voltage endurance characteristics when UV cleaning had been performed on the blue glass plate.

The dielectric layers formed using the paints of Examples 23 and 24 had insufficient voltage endurance characteristics when formed on the untreated blue glass plate. However, these dielectric layers had voltage endurance characteristics sufficient for practical use when UV cleaning had been performed on the blue glass plate.

On the other hand, the dielectric layers formed using the paints of Comparative Examples 5 and 6 had voids and/or pin-holes, and had voltage endurance characteristics somewhat inferior to those of the dielectric layers of Examples 18 to 24.

As is apparent from Table 6, the address electrode protective films a formed using the paints of Examples 18 to 22 had no defects such as voids or pin-holes and had a sufficient effect as a protective film.

The address electrode protective films formed using the paints of Examples 23 and 24 had voids and/or pin-holes when formed on the untreated blue glass plate and had an insufficient effect as a protective film. However, these address electrode protective films had no voids or pin-holes when formed on the UV-treated blue glass plate and had a sufficient effect as a protective film.

On the other hand, the dielectric layers formed using the paints of Comparative Examples 5 and 6 had voids and/or pin-holes, and had an insufficient effect as a protective film.

As is apparent from Table 6, the partition walls formed using the paints of Examples 18 to 21 had no defects such as voids or pin-holes, and a portion of the partition walls was not separated from the blue glass plate.

The partition walls formed using the paint of Example 22 had no voids or pin-holes, but they were separated from the blue glass plate, in some cases. However, the occurrence of the separation of the partition walls was suppressed when UV cleaning had been performed on the blue glass plate.

The partition walls formed using the paints of Examples 23 and 24 had voids and/or pin-holes and were separated from the blue glass plate, in some cases, when formed on the untreated blue glass plate. However, the partition walls had no voids or pin-holes and were not separated from the blue glass plate when formed on the UV-treated blue glass plate, and thus had a sufficient effect as partition walls.

On the other hand, in the partition walls formed using the paints of Comparative Examples 5 and 6, voids and/or pin-holes were generated, a region where no partition wall was formed was generated, and a portion of the partition walls were separated from the blue glass plate.

Examples 25 to 28 and Comparative Examples 7 and 8

Wettabilities of the mixed solvents obtained by mixing the organic solvents in the ratio shown in Table 2 to the blue glass plate (#0050) were evaluated in the same manner as in Examples 1 to 7 and Comparative Examples 1 and 2. In Table 2, DCr denotes diethyl carbitol; CrAc denotes carbitol acetate; and BCA denotes butyl carbitol acetate. The solvent used in Examples 8, 9, 10, and 11 was used as the solvent of Examples 25, 26, 27, and 28, respectively, and the solvent used in Comparative Examples 3 and 4 was used as the solvent of Comparative Examples 7 and 8, respectively. Paints for forming an insulating film were prepared, insulating films were formed on the blue glass plate using these paints, and the breakdown voltage, an effect of protecting address electrodes, and effect as partition walls were evaluated in the same manner as in Examples 18 to 24 and Comparative Examples 5 and 6. The results are shown in Table 7.

TABLE 7

|  |  |  | Example | | | | Comparative Example | |
|---|---|---|---|---|---|---|---|---|
| Example No. | | | 25 | 26 | 27 | 28 | 7 | 8 |
| contact angle | glass substrate | untreated | <5° | <5° | 0°–8° | 0°–9° | 7.8° | 10.3° |
|  |  | UV-treated | <5° | <5° | <5° | <5° | 7.6° | 11.8° |

TABLE 7-continued

|  |  |  | Example | | | | Comparative Example | |
|---|---|---|---|---|---|---|---|---|
| Example No. | | | 25 | 26 | 27 | 28 | 7 | 8 |
| breakdown voltage | Ag electrode | untreated | 1.7 kV | 1.8 kV | 1.4 kV | 1.3 kV | 0.8 kV | 0.6 kV |
|  |  | UV-treated | 1.7 kV | 1.8 kV | 1.7 kV | 1.6 kV | 0.7 kV | 0.6 kV |
|  | Cr—Cu—Cr electrode | untreated | 1.7 kV | 1.7 kV | 1.3 kV | 1.3 kV | 0.8 kV | 0.5 kV |
|  |  | UV-treated | 1.8 kV | 1.8 kV | 1.7 kV | 1.7 kV | 0.7 kV | 0.5 kV |
|  | Ag electrode + ITO electrode | untreated | 1.8 kV | 1.9 kV | 1.2 kV | 1.4 kV | 0.7 kV | 0.7 kV |
|  |  | UV-treated | 1.7 kV | 1.8 kV | 1.8 kV | 1.8 kV | 0.7 kV | 0.5 kV |
|  | Cr—Cu—Cr electrode + ITO electrode | untreated | 1.9 kV | 1.9 kV | 1.3 kV | 1.5 kV | 0.8 kV | 0.6 kV |
|  |  | UV-treated | 1.8 kV | 1.8 kV | 1.7 kV | 1.7 kV | 0.7 kV | 0.5 kV |
| effect of protecting address electrode | | untreated | ○ | ○ | ○ | ○ | X | X |
|  | | UV-treated | ○ | ○ | ○ | ○ | X | X |
| effect as partition wall | | untreated | ○ | ○ | Δ | Δ | X | X |
|  | | UV-treated | ○ | ○ | ○ | ○ | Δ | X |

As is apparent from Table 7, the dielectric layers formed using the paints of Examples 25 and 26 had no voids or pin-holes and had excellent voltage endurance characteristics.

The dielectric layers formed using the paint of Examples 27 and 28 had no voids or pin-holes and had voltage endurance characteristics sufficient for practical use in the untreated substrates. The voltage endurance characteristics of the dielectric layer were further improved by performing the UV cleaning.

On the other hand, the dielectric layers formed using the paints of Comparative Examples 7 and 8 had voids and/or pin-holes, and had voltage endurance characteristics somewhat inferior to those of the dielectric layers of Examples 25 to 28.

Further, regarding the effect of protecting address electrodes, the address electrode protective films formed using the paints of Examples 25 to 28 had no defects such as voids or pin-holes and had a sufficient effect as a protective film, as is apparent from Table 7.

On the other hand, the dielectric layers formed using the paints of Comparative Examples 7 and 8 had voids and/or pin-holes, and had an insufficient effect as a protective film.

Further, regarding the effect as partition walls, the partition walls formed using the paints of Examples 25 and 26 had no defects such as voids or pin-holes, and a portion of the partition walls was not separated from the blue glass plate, as is apparent from Table 7. Further, the partition walls formed using the paint of Examples 27 and 28 had no voids or pin-holes, but they were separated from the blue glass plate, in some cases. However, the occurrence of the separation of the partition walls was suppressed by performing UV cleaning.

On the other hand, in the partition walls formed using the paints of Comparative Examples 7 and 8, voids and/or pin-holes were generated, a region where no partition wall was formed was generated, and a portion of the partition walls was separated from the blue glass plate.

As specifically described above, a paint for forming an insulating film according to the present invention includes as a main solvent an organic solvent that has a good wettability to glass (e.g., glass substrate), ceramic (e.g., Ag electrode), and a metal compound (e.g., ITO film) and forms a contact angle of less than 5° with these inorganic materials, the main solvent being at least 50 wt. % of the whole solvent. Thus, the paint has a good wettability to a glass substrate, an Ag electrode, and an ITO film and occurrence of the crawling and generation of cavities thus can be prevented. Therefore, since an insulating film having no voids or pin-holes can be obtained by using the paint for forming an insulating film according to the present invention, a plasma display panel having an excellent voltage endurance characteristics can be provided.

In addition, a plasma display panel can be obtained with high yield by forming a dielectric layer on its front glass substrate, or a dielectric layer or partition walls on its back glass substrate using a paint for forming an insulating film according to the present invention.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of manufacturing a plasma display panel comprising:
    coating a paint for forming an insulating film onto a member of a plasma display panel that comprises an inorganic material on a surface of the member, the paint comprising inorganic fine particles (a), a binder resin (b), and a solvent (c) that forms a contact angle of less than 5° with the inorganic material of the member; and
    forming an insulating film on the member from the paint.

2. A method of manufacturing a plasma display panel according to claim 1,
    wherein the member is a back plate of a plasma display panel, which is provided with address electrodes, and the insulating film serves as an address electrode protective film.

3. A method of manufacturing a plasma display panel according to claim 1,
    wherein the member is a back plate of a plasma display panel and the insulating film serves as partition walls.

4. A method of manufacturing a plasma display panel according to claim 1,
    wherein the member is a front plate of a plasma display panel, which is provided with display electrodes, and the insulating film serves as a dielectric layer.

5. A method of manufacturing a plasma display panel according to claim 1,
    wherein the member is cleaned by ultraviolet cleaning before being coated with the paint.

* * * * *